US010974289B2

(12) United States Patent
Hall et al.

(10) Patent No.: US 10,974,289 B2
(45) Date of Patent: Apr. 13, 2021

(54) METHODS OF MITIGATING BITUMINOUS MATERIAL ADHESION USING NANO-PARTICLES

(71) Applicant: Halliburton Energy Services, Inc., Houston, TX (US)

(72) Inventors: Lee J. Hall, The Woodlands, TX (US); Philip W. Livanec, Deer Park, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/058,397

(22) Filed: Aug. 8, 2018

(65) Prior Publication Data

US 2018/0347279 A1 Dec. 6, 2018

Related U.S. Application Data

(62) Division of application No. 13/851,374, filed on Mar. 27, 2013, now Pat. No. 10,077,606.

(51) Int. Cl.
*B08B 3/04* (2006.01)
*E21B 7/00* (2006.01)
*E21B 37/06* (2006.01)
*C09K 8/03* (2006.01)
*C09K 8/524* (2006.01)

(52) U.S. Cl.
CPC .......... *B08B 3/04* (2013.01); *C09K 8/03* (2013.01); *C09K 8/524* (2013.01); *E21B 7/00* (2013.01); *E21B 37/06* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 2,943,679 A | 7/1955 | Scott et al. | |
| 2,943,976 A | 7/1960 | Goodhue et al. | |
| 4,431,550 A | 2/1984 | Block | |
| 4,444,699 A | 4/1984 | Hayford | |
| 4,510,998 A | 4/1985 | Peiffer | |
| 4,575,542 A | 3/1986 | Treybig | |
| 4,768,593 A * | 9/1988 | Novak | C09K 8/24 166/295 |
| 5,076,358 A * | 12/1991 | Kissel | C09K 8/524 166/275 |
| 7,032,664 B2 | 4/2006 | Lord et al. | |
| 7,033,975 B2 | 4/2006 | Baran | |
| 7,072,143 B2 | 7/2006 | Kunikata | |
| 7,264,850 B1 | 9/2007 | Itoh | |
| 7,559,369 B2 | 7/2009 | Roddy et al. | |
| 7,665,523 B2 | 2/2010 | Perez | |
| 7,784,542 B2 | 8/2010 | Roddy et al. | |
| 7,786,049 B2 | 8/2010 | Temple | |
| 7,806,183 B2 | 10/2010 | Roddy et al. | |
| 7,892,352 B2 | 2/2011 | Roddy et al. | |
| 2003/0024703 A1 | 2/2003 | Mckenzie et al. | |
| 2003/0220204 A1 | 11/2003 | Baran et al. | |
| 2005/0272611 A1 | 12/2005 | Lord et al. | |
| 2008/0217008 A1 | 9/2008 | Langdon et al. | |
| 2010/0016183 A1 | 1/2010 | Roddy et al. | |
| 2010/0025039 A1 | 2/2010 | Roddy et al. | |
| 2010/0096136 A1 | 4/2010 | Bourne | |
| 2010/0096139 A1 | 4/2010 | Holcomb et al. | |
| 2010/0273912 A1 | 10/2010 | Roddy et al. | |
| 2011/0272325 A1 | 11/2011 | Soane et al. | |
| 2012/0015852 A1 | 1/2012 | Quintero | |
| 2012/0132423 A1 | 5/2012 | Livanec | |
| 2012/0168165 A1 | 7/2012 | Holcomb et al. | |
| 2012/0175120 A1 | 7/2012 | Holcomb et al. | |
| 2012/0186494 A1 | 7/2012 | Roddy et al. | |
| 2012/0202047 A1 * | 8/2012 | Welch | B32B 5/16 428/323 |
| 2012/0211227 A1 | 8/2012 | Thaemlitz | |
| 2012/0245059 A1 | 9/2012 | McDonald | |

(Continued)

FOREIGN PATENT DOCUMENTS

EP 0168353 1/1986
EP 0245059 11/1987

(Continued)

OTHER PUBLICATIONS

Yin Zhu Ye et al. "Nanon-Materials Create a Whole New World to Oil Industry", Key Engineering Materials, vol. 519, Jul. 26, 2012 pp. 256-260.
Extended European Search report for European Patent Application No. 14774413.0 dated Oct. 25, 2016.
International Search Report and Written Opinion from PCT/US2014/032067, dated Jul. 24, 2014.
Roustaei et al., "An Experimental Investigation of Polysilicol Nanoparticles' Recovery Efficiencies Through Changes in Interfacial Tension and Wettability Alteration," SPE 156976, 1-7, Jun. 12, 2012.
Shahrabadi et al., Experimental Investigation of HLP Nanofluid Potential to Enhance Oil Recovery: A mechanistic Approach, SPE 156642, pp. 1-9, Jun. 12, 2012.
McElfresh et. al, "Application of Nanofluid Technology to Improve Recovery in Oil and Gas Wells," SPE 154827, pp. 1-5, Jun. 12, 2012.

(Continued)

*Primary Examiner* — Mikhail Kornakov
*Assistant Examiner* — Ryan L Coleman
(74) *Attorney, Agent, or Firm* — Tenley Krueger; C. Tumey Law Group PLLC

(57) ABSTRACT

Embodiments relate to solid nano-particles applied to the surface of well equipment to treat bituminous material adhesion. An embodiment provides a method of treating the surface of well equipment. The method may comprise applying a solid nanoparticle film to the surface of the well equipment with a treatment fluid comprising solid nanoparticles. The method may further comprise allowing the solid nanoparticles to interact with the surface of the well equipment and/or bituminous materials adhered to the surface of the well equipment to remove at least a portion of the bituminous materials from the surface of the well equipment.

14 Claims, No Drawings

(56) References Cited

U.S. PATENT DOCUMENTS

| | | |
|---|---|---|
| 2012/0255887 A1 | 10/2012 | Holms et al. |
| 2012/0283149 A1 | 11/2012 | Livanec |
| 2012/0285690 A1 | 11/2012 | Weaver et al. |
| 2013/0032409 A1 | 2/2013 | Livanec et al. |
| 2014/0124205 A1 | 5/2014 | Nasr-El-Din et al. |
| 2014/0290692 A1 | 10/2014 | Hall |
| 2014/0290958 A1 | 10/2014 | Marr |
| 2014/0311528 A1 | 10/2014 | Hallundbæk |
| 2015/0107832 A1 | 4/2015 | DeWolf et al. |

FOREIGN PATENT DOCUMENTS

| | | |
|---|---|---|
| EP | 0285690 | 10/1988 |
| WO | 2010148204 | 12/2010 |

OTHER PUBLICATIONS

McElfresh et al., "Stabilizing Nano Particle Dispersion in High Salinity, high Temperature Downhole Environments," SPE 154758, pp. 1-6, Jun. 12, 2012.
Wasan et al., "Spreading of Nanofluids on Solids", Nature, vol. 423, pp. 156-159, May 8, 2003.
Paiaman et al., "Feasibility of Decreasing Pipe Sticking Probability using Nanoparticles", NAFTA, vol. 60, pp. 645-647, 2009.
Srivatsa et al., "Feasibility of Decreasing Pipe Sticking Probability using Nanoparticles as Fluid Loss Additives in a Surfactant-Polymer Based Drilling Fluid", IPTC 14952, pp. 1-19, Feb. 7, 2012.
Javeri et al., "Mitigating Loss Circulation and Differential Sticking Problems using Silicon Nanoparticles", SPE/IADC 145840, pp. 1-4, Oct. 24, 2011.
Zakaria et al. "Novel nanoparticle—Based Drilling Fluid with Improved Characteristics", SPE 156992, pp. 1-6, Jun. 12, 2012.
HES Brochure "Barazan® D" dated Mar. 25, 2010.
HES Brochure "Baracor® 700" dated Mar. 24, 2010.
DOW Brochure "Triton™ X-100 Surfactant" dated Jan. 5, 2011.
Enform, IRP 3.2.3 Drilling Operations, May 2012, Drilling and Completion Committee, p. 1-20.
Halford, ACS Meeting News, Apr. 6, 2005, Chemical and Engineering News, first paragraph.
Wikipedia, Nanoparticle, Nov. 16, 2015, Wikipedia, first sentence.
Sridhara et al, (Al2O3-based nanofluids: a review, Jul. 16, 2011, Nanoscale Res. Lett., 2011: (6)1: 456, paragraph fom introduction and paragraph from applications of alumina-based nanofluids.
lifewater.ca, Mixing and Using Drill Mud, Feb. 1, 2001, lifewater.ca, date stamp, title, 1 paragraph discussing drilling process.
Rohm and Haas, Acumer 1510 Polyacrylic Acid Homopolymer, 2008, Rohm and Haas, tittle, performance advantages paragraph, dilutability with water, compatibility with organic solvent paragraph.
Notice of Allowance for U.S. Appl. No. 13/851,374 dated May 21, 2018.
U.S. Office Action for U.S. Appl. No. 16/058,336 dated Apr. 16, 2020.
USPTO Notice of Allowance for U.S. Appl. No. 16/058,336 dated Jul. 27, 2020.

\* cited by examiner

METHODS OF MITIGATING BITUMINOUS MATERIAL ADHESION USING NANO-PARTICLES

CROSS REFERENCE TO RELATED APPLICATIONS

This application is a divisional of U.S. patent application Ser. No. 13/851,374, titled "Methods of Mitigating Bituminous Material Adhesion Using Nano-Particles," filed on Mar. 27, 2013 the entire disclosure of which is incorporated herein by reference.

BACKGROUND

The present invention relates to subterranean operations. More particularly, the present invention relates to solid nano-particles applied to the surface of well equipment to treat bituminous material adhesion.

Many subterranean operations involve the drilling of a well bore from the surface through rock and/or soil to penetrate a subterranean formation containing fluids that are desirable for production. In the course of drilling operations and other subterranean operations, the drill string and/or other equipment and tools may come into contact with zones of rock and/or soil containing tar and/or heavy oil, such as heavy and light (liquid) hydrocarbons, asphalt, and bitumen; collectively referred to herein as "bituminous materials;" wherein these zones are collectively referred to herein as "bituminous sand zones." In many such operations, it may be desirable to drill the well bore through these bituminous sand zones. However, problems may be encountered when drilling through bituminous sand zones. For example, bituminous materials are typically relatively tacky substances that may adhere to any surfaces they contact. In addition, bituminous materials may dissolve into many types of treatment fluids used in the course of drilling operations, increasing the tackiness and adhesive properties of the bituminous materials. If a sufficient amount of bituminous materials adheres to surfaces in the well equipment, it may, among other problems, prevent the drillstring from rotating, prevent fluid circulation, increase non-productive time, create torque and drag issues, cause tool damage, or otherwise impede the effectiveness of a drilling operation. In some cases, it may become necessary to remove and/or disassemble the drillstring in order to remove accretions of bituminous materials, a process which may create numerous cost and safety concerns. The accretion of bituminous materials on drilling equipment and/or in the well bore also can impede any subsequent operations downhole, including cementing, acidizing, fracturing, sand control, and remedial treatments. In addition, soft, tacky bituminous materials that manage to reach the surface may foul surface equipment, including solids screening equipment and solids control equipment, for example, by binding shaker screens.

Existing methods of managing the problems that result from well bore bituminous material incursion may be problematic. Examples of conventional methods may utilize treatment fluids that comprise dispersants, surfactants, and/or solubilizers, which allow the bituminous materials to dissolve in or homogenize with the treatment fluids. However, the bituminous materials may not be readily separated out of the fluid once they have dissolved into or homogenized with the fluid. The presence of the bituminous materials in the treatment fluid may alter its rheological properties and/or suspension capacity, which may limit its use in subsequent operations. Moreover, the addition of these dispersants, surfactants, and solubilizers may increase the complexity and cost of the drilling operation.

SUMMARY

The present invention relates to methods for drilling through bituminous sands in subterranean operations. More particularly, the present invention relates to solid nano-particles applied to the surface of well equipment to treat bituminous material adhesion.

An embodiment provides a method of treating the surface of well equipment. The method may comprise applying a solid nanoparticle film to the surface of the well equipment with a treatment fluid comprising solid nanoparticles. The method may further comprise allowing the solid nanoparticles to interact with the surface of the well equipment and/or bituminous materials adhered to the surface of the well equipment to remove at least a portion of the bituminous materials from the surface of the well equipment.

Another embodiment provides a method of treating bituminous materials. The method may comprise using a drill bit to enlarge a well bore in a subterranean formation, wherein bituminous materials from the subterranean formation enters the well bore and adheres to well bore equipment in the well bore. The method may further comprise circulating a treatment fluid past the drill bit, the treatment fluid comprising solid nanoparticles, wherein the solid nanoparticles interact with the surface of the well bore equipment and/or the bituminous materials to remove at least a portion of the bituminous materials from the well bore equipment. The method may further comprise filtering the bituminous materials from the treatment fluid.

Another embodiment provides an apparatus for use in subterranean operations. The apparatus may comprise well equipment and a film of solid nanoparticles on a surface of the well equipment.

DESCRIPTION OF PREFERRED EMBODIMENTS

The present invention relates to methods for drilling through bituminous sands in subterranean operations. More particularly, the present invention relates to solid nano-particles applied to the surface of the well equipment to treat bituminous materials.

The methods of the present invention generally comprise a treatment fluid for applying a solid nanoparticle suspension to the well equipment. As used herein, the term "treatment fluid" refers to any fluid that may be used in a subterranean formation or in conjunction with drilling in a subterranean formation. The term "treatment fluid" does not imply any particular action by the fluid or any component thereof. Treatment fluids may be used, for example, to drill, complete, work over, fracture, repair, clean, filter, or in any way prepare a well bore and/or well equipment for recovery of materials residing in a subterranean formation penetrated by the well bore. Well equipment may comprise, but is not to be construed as being limited to, oil and gas well equipment and drilling and completion equipment. Specific examples of well equipment includes drill pipe, drill collars, drills bits of all types, mud motors, directional drills, casings, liners, shakers and shaker screens, centrifuges, metal lines, fittings, impellers, etc. Well equipment may not necessarily be in the well bore or used in the well bore when treated but may be treated at any time in conjunction with their use in drilling or treating the well bore. For example, the well equipment may be used at the surface during the well bore operation. Examples of treatment fluids include, but are not limited to, cement compositions, drilling fluids, spacer fluids, cleaning fluids, and spotting fluids.

Generally, any solid nanoparticles that are non-magnetic and can be dispersed in the aqueous fluid may be used in embodiments of the present invention. In particular embodiments, the solid nanoparticles should not emulsify the bituminous materials. To increase particle mobility, embodiments of the solid nanoparticles may comprise almost spherical morphologies with aspect ratios near unity. The nanoparticles may be ionic or nonionic in nature. In certain embodiments, the solid nanoparticles may interact with the surface of the well equipment to form a film at the interface between the bituminous materials and the well equipment wherein the film of solid nanoparticles exerts a disjoining force, between the interface of the bituminous materials and the well equipment to separate the two. Thus, the solid nanoparticle treatment fluid should be added to the well bore in a quantity sufficient to treat the bituminous materials therein, in accordance with embodiments of the present invention. In some embodiments, the solid nanoparticles may be spherical in nature. For example, the solid nanoparticles may have a roundness and sphericity, as measured on the Krumbein scale, of greater than 0.7, in some embodiments, and greater than about 0.9 in alternative embodiments.

In certain embodiments, the concentration of the solid nanoparticles in the treatment fluid may be at least about 0.1% by volume of the fluid. As an example the solid nanoparticles may present in an amount of at least about 0.1%, at least about 0.2%, at least about 0.3%, etc. as well as at least about 1%, at least about 2%, at least about 3%, at least about 4%, at least about 5%, etc. For example, the concentration of the solid nanoparticles in the treatment fluid may be in the range of from about 0.5% to about 1% by volume of the fluid. As another example, the concentration of the solid nanoparticles in the treatment fluid may be in the range for from about 0.1% to about 5% by volume of the fluid. In certain embodiments, the solid nanoparticles may be added to a treatment fluid, or introduced directly into the well bore, as dispersed particles. One of ordinary skill in the art, with the benefit of this disclosure, should be able to determine the appropriate concentration of the nanoparticles in the treatment fluid for a particular application.

In certain embodiments, solid nanoparticles may have a particle size of less than about 200 nanometers (nm). The solid nanoparticles may have a particle size that ranges between or includes any of about 1 nm, about 2 nm, about 3 nm, about 4 nm, about 50, about 100, about 150, about 197 nm, about 198 nm, about 199 nm, or about 200 nm. In certain embodiments, the size of the nanoparticles may be in the range of from about 1 nm to about 50 nm. In certain embodiments, the size of the solid nanoparticles may be in the range of from about 5 nm to about 50 nm. In certain embodiments, the size of the solid nanoparticles may be in the range of from about 5 nm to about 200 nm. In certain embodiments, the solid nanoparticles may be added to a treatment fluid, or introduced directly into the well bore, as dispersed particles. One of ordinary skill in the art, with the benefit of this disclosure, should be able to determine the appropriate size of the solid nanoparticles in the treatment fluid for a particular application.

Examples of solid nanoparticles that may be suitable for use in the treatment of bituminous materials include, but are not limited to, oxides such as $SiO_2$, $Al_2O_3$, boehmite ($\gamma$-AlO(OH)), $TiO_2$, ZnO, $Fe_2O_3$, ZrO, or others; carbonates such as $CaCO_3$ or others; silicon compounds such as SiC, $Si_3N_4$, or others; and carbon based particles such as graphite, fullerenes, activated carbon, various grades of amorphous carbon black, or others. Combinations of suitable nanoparticles may also be suitable, in certain embodiments.

The aqueous fluid utilized in the treatment fluids of the present invention may be fresh water or salt water (e.g., water containing one or more salts dissolved therein). For example, the nanoparticles may be dispersed in the aqueous fluid to form the treatment fluid. In certain embodiments, the treatment fluid may be an aqueous-based fluid. Generally, the water can be from any source, provided that it does not contain compounds that undesirably affect other components of the treatment fluid.

Optionally, some embodiments may include a surfactant to aid in the suspension of the nanoparticles. Generally, any surfactant that will suspend the nanoparticles may be used in the fluids of the present invention. In certain embodiments, it may be desirable to select a surfactant that will not emulsify the bituminous materials sought to be treated. In certain embodiments, the surfactants may be present in an amount sufficient to suspend the nanoparticles. This amount may depend on, among other things, the type of surfactant used and the amount of the nanoparticles to be suspended. Examples of surfactants include anionic surfactants such as sodium dodecyl sulfate, sodium dodecyl benzene sulfonate, BARACOR 700® corrosion inhibitor available from Halliburton Energy Services, Inc.; nonionic surfactants such as polysorbate 80, Triton® X-100 available from The Dow Chemical Company, Pluronic® available from BASF. A person of ordinary skill in the art should recognize, with the benefit of this disclosure, the type and amount of surfactant that should be added for a particular application.

In certain embodiments, the treatment fluids of the present invention may also comprise additional components to enhance, among other things, the performance of the nanoparticles in specific applications. For example, some embodiments may comprise a viscosifier, among other purposes, to aid in suspending the nanoparticles in a treatment fluid. Suitable viscosifying agents may include, but are not limited to, colloidal agents (e.g., clays such as bentonite), diatomaceous earth, biopolymers (e.g., xanthan gum, guar gum, chitosan, polysaccharides), synthetic polymers (e.g., polyacrylates, polyacrylamides), or mixtures thereof. An example of which includes BARAZAN® D viscosifier, available from Halliburton Energy Services Inc. A person of ordinary skill in the art should recognize, with the benefit of this disclosure, the type and amount of viscosifier that should be added for a particular application.

Certain embodiments may also comprise additional components to enhance, among other things, the performance of the solid nanoparticles in specific applications. The solid nanoparticles may be functionalized by a surface modification or surface treatment with the desired functional groups. For example, some embodiments may comprise surface treatment of the nanoparticles with one or more polymers which, among other purposes, may aid in suspending the nanoparticles in a treatment fluid. Suitable polymers for surface treatment may include, but are not limited to, polyvinyl pyrrolidone, polyvinyl alcohol, polyacrylic acid, polyvinyl acetate, polyethyleneimine, and any combinations thereof. A person of ordinary skill in the art should recognize, with the benefit of this disclosure, the type and amount of polymer that should be added for a particular application.

Additional embodiments may also comprise additional components to enhance, among other things, the treatment of the bituminous materials. For example, the solid nanoparticles may be paired with additional bituminous treatment materials to produce a synergistic effect in the treatment of the bituminous materials. As an example, some embodiments may comprise polymers which, among other purposes, provide a different yet synergistic bituminous material treatment action, examples of which include an acrylonitrile-butadiene copolymer comprising two or more different monomers wherein the monomers may be substituted with a number of different groups that will be evident to those of ordinary skill in the art, including without limitation chloro groups, bromo groups, fluoro groups, alkyl groups, alkoxy groups, alkenyl groups, alkynyl groups, aryl groups, alkoxy groups, and substituted versions thereof. Additional examples include styrene polymers comprising styrene copolymers which include co-monomers of styrene or any derivative thereof, wherein the styrene may be substituted with any number of different groups that will be evident to those of ordinary skill in the art, including without limitation chloro groups, bromo groups, fluoro groups, alkyl groups, alkoxy groups, alkenyl groups, alkynyl groups, aryl groups, and substituted versions thereof Further examples include acrylate polymers which include co-monomers of acrylate or any derivative thereof, wherein the acrylate may be substituted with any number of different groups that will be evident to those of ordinary skill in the art, including without limitation chloro groups, bromo groups, fluoro groups, alkyl groups, alkoxy groups, alkenyl groups, alkynyl groups, aryl groups, and substituted versions thereof; additionally in accordance with present embodiments, the acrylate may comprise two or more units individually selected from the group consisting of -acrylate, -methacrylate, -ethylacrylate, -propylacrylate, -butylacrylate, -tert-butyl-acrylate, -acrylate, -n-hydroxyethyl methacrylate, -potassium acrylate, -pentabromobenzyl acrylate, -methyl methacrylate, -ethyl methacrylate, -n-nitrophenyl acrylate, -methyl 2-(acyloxymethyl)acrylate, -cyclohexyl acrylate, -n-ethylhexyl acrylate, any derivative thereof. Other examples include styrene-acrylate polymers such as styrene-acrylate copolymers and mixed copolymers which include at least one of styrene, a substituted styrene, and any derivative thereof; and at least one of -acrylate, -methacrylate, -ethylacrylate, -propylacrylate, -butylacrylate, -tert-butyl-acrylate, -n-hydroxyethyl methacrylate, -potassium acrylate, -pentabromobenzyl acrylate, -methyl methacrylate, -ethyl methacrylate, -n-nitrophenyl acrylate, -methyl 2-(acyloxymethyl) acrylate, -cyclohexyl acrylate, -n-ethylhexyl acrylate, or any derivative thereof. Combinations of these different materials may also be used. A person of ordinary skill in the art should recognize, with the benefit of this disclosure, the type and amount of polymer that should be added for a particular application.

Certain embodiments may also comprise covalently functionalizing the nanoparticles to enhance, among other things, the performance of the nanoparticles in specific applications. For example, some embodiments may comprise nanoparticles which comprise reactive functional groups that are covalently bonded to the nanoparticles. These reactive functional groups may bind additional additives or alter the behavior of the nanoparticles in the treatment fluid and/or well bore. Functionalizing groups may include tricholorosilanes, alkoxysilanes, esters, alcohols, acids, amines, and carboxylates. Specific examples of which include n-propylamine, stearic acid, polyethylene glycol chains, phenol, R—Si—$Cl_3$, R—Si-$(EtOH)_3$, and R—Si-$(MeOH)_3$ wherein R may be an n-alkyl (C6-C18). The reactive functional groups may be any group suitable for binding the targeted substrate or altering the behavior of the solid nanoparticles. Likewise, the process of covalently functionalizing the solid nanoparticles may comprise any process suitable for binding the reactive functional group to the targeted nanoparticle. A person of ordinary skill in the art should recognize, with the benefit of this disclosure, the type of covalent functionalization and reactive functional group necessary for a given application.

The treatment fluids of the present invention optionally may comprise additional additives to enhance the performance of the fluid. The treatment fluids of the present invention may comprise any such additional additives that do not undesirably interact with the solid nanoparticles or other components of the fluid. Generally, additional additives should not emulsify or dissolve the bituminous materials to be treated. The treatment fluids used in methods of the present invention optionally may comprise any number of additional additives, including, but not limited to, salts, surfactants, fluid-loss-control additives, gas, nitrogen, carbon dioxide, surface-modifying agents, tackifying agents, foamers, corrosion inhibitors, scale inhibitors, catalysts, clay-control agents, biocides, friction reducers, antifoam agents, bridging agents, dispersants, flocculants, $H_2S$ scavengers, $CO_2$ scavengers, oxygen scavengers, lubricants, viscosifiers, breakers, weighting agents (e.g., barite), relative-permeability modifiers, resins, particulate materials (e.g., proppant particulates), wetting agents, coating-enhancement agents, and the like. One of ordinary skill in the art, with the benefit of this disclosure, should be able to determine which additional additives are appropriate for a particular application.

Embodiments of the present invention should not be construed to comprise one additive, component, or embodiment to the exclusion of others. Embodiments may comprise suspensions of solid nanoparticles alone, solid nanoparticles and surfactants, covalently functionalized solid nanoparticles alone, covalently functionalized solid nanoparticles and surfactants, solid nanoparticles and polymers, covalently functionalized solid nanoparticles and polymers, solid nanoparticles and surfactants and polymers, covalently functionalized solid nanoparticles and surfactants and polymers, and any combinations, mixtures, etc. therein. A person of ordinary skill in the art should recognize, with the benefit of this disclosure, the type and functionalization (if necessary) of solid nanoparticles and any additional additive(s) necessary to formulate a treatment fluid for a specific well bore operation.

In embodiments, the treatment fluid is used to treat bituminous materials. Bituminous materials may comprise tar. One of the many advantages of the present invention, many of which are not discussed or alluded to herein, is that tar treated by the methods disclosed herein may be less able to adhere to a surface. As a result, tar treated in this manner may be susceptible to screen separation from treatment fluids, drill cuttings, tar sands, and the like. In some embodiments bituminous materials may comprise heavy oil. The treatment fluids may be used for the treatment of heavy oil in a well bore. It should be understood that the terms "heavy oil," "crude oil," and "liquid crude" may be used interchangeably. Heavy oil is generally a naturally occurring liquid that can contain various quantities of paraffins, napthenenes, aromatics, and/or asphaltenes. The heavy oil should be differentiated from the preceding tar, as the heavy oil has an API measured gravity greater at about 10 or greater while the tar has an API specific gravity of less than 10. In some instances, natural gas may be dissolved in the heavy oil. Heavy oil may be produced from well bores drilled into the Earth's surface. When encountered in the well bore by treatments fluids, the heavy oil can emulsify into the fluid undesirably effecting fluid properties and causing problems with fluid disposal.

Without being limited by theory, the following is one description of a proposed mechanism of action. Generally, the methods of the present invention comprise allowing a treatment fluid comprising solid nanoparticles to interact with the surface of the well equipment, which may, among other things, reduce the adhesiveness of the bituminous materials to the well equipment, which may facilitate removal of the bituminous materials from a well bore or other surface. When the solid nanoparticles interact with the surface of the well equipment the nanoparticles coat the surface of the material and form a film. The solid nanoparticles should self-assemble into the film at the surface of the well equipment. In accordance with present embodiments, the solid nanoparticles exert a disjointing force, sometimes referred to as a disjoining pressure that is concentrated at the interface between the bituminous materials and the well equipment. It is believed that this disjointing force should create, through surface energetics and Brownian motion, a wedge that drives the separation of the bituminous materials from the surface of the well equipment. It is further believed that the solid nanoparticle film grows and is replenished by the addition of solid nanoparticles from the suspension driven by Brownian motion. Without being limited by theory, the smaller the particles are, the faster they are able to move through the medium at a given temperature. Thusly, the smaller particles have a greater probability, as compared to larger particles, to add to the growing wedge and to do so in a shorter time. Without being limited by theory, the film thickness scales at approximately a factor of 1.2 multiplied by the diameter of the solid nanoparticle for up to approximately five layers. The addition of surfactants or other binding groups can alter the size of the wedge. The size or thickness of a functioning wedge can range from about 5 nm to about 350 nm.

In one embodiment, the present invention provides a method comprising contacting the surface of well equipment with a treatment fluid comprising an aqueous fluid and solid nanoparticles. In such embodiments, solid nanoparticles may be provided in various forms, including, but not limited to, an emulsion, a suspension, a powder, and any combination thereof. In certain embodiments, the treatment fluid may be an aqueous-based fluid. Introducing the solid nanoparticles to the vicinity of a desired portion of the well equipment may be accomplished by a variety of methods known by a person of ordinary skill in the art with the benefit of this disclosure. One example of such a method comprises pumping water into the well bore, wherein the nanoparticles are carried into the well bore on the leading edge of the water (e.g., a plug). In other embodiments of the present invention, the nanoparticles may be pumped into the well bore while suspended in a treatment fluid.

In certain embodiments, the nanoparticles may be provided as a "spot treatment" or "pill," wherein the nanoparticles are pumped into the well bore to interact with the bituminous materials on a specific portion of the well equipment. In certain embodiments of this type, the solid nanoparticles may be allowed to interact with the well equipment for at least a time sufficient to at least partially reduce the amount of bituminous material attached to the well equipment. In some circumstances, this may be more than about one hour. In others, more time will be required to at least partially reduce the amount of the bituminous material, depending upon, among other factors, the temperature inside the well bore and the amount of bituminous material on the portion of the well equipment being treated. One of ordinary skill in the art, with the benefit of this disclosure, should be able to determine the appropriate amount of time to allow the nanoparticles to interact with the surface of the well equipment. In certain embodiments, after the nanoparticles have been allowed to interact with the surface of the well equipment, the bituminous materials may then be removed from the well bore and/or the well bore and/or the wellbore and surface equipment by any means practicable for the given application.

In some applications, embodiments of the present invention may be used in conjunction with non-aqueous treatment fluids. Embodiments such as a spot treatment or pill may be especially suited for use in conjunction with non-aqueous-based treatment fluids. Where the treatment fluid is non-aqueous based, the treatment fluid may comprise any number of organic liquids. Examples of suitable organic liquids include, but are not limited to, mineral oils, synthetic oils, esters, paraffin oils, diesel oil, and the like.

In another embodiment, the present invention provides a method comprising contacting bituminous materials resident in a well bore with a treatment fluid comprising an aqueous fluid and nanoparticles by pumping the treatment fluid into a well bore in a manner such that it may contact the surface of the well equipment and allowing the treatment fluid to interact with bituminous materials resident in the well bore to at least partially reduce the amount of bituminous materials attached to a surface or the tendency of the bituminous materials to adhere to a surface. In certain embodiments of this type, the treatment fluid may be allowed to interact with the well equipment and/or the bituminous materials as long as the treatment fluid is present in the well bore. One of ordinary skill in the art, with the benefit of this disclosure, should be able to determine the appropriate amount of time to allow the treatment fluid to interact with the surface of the well equipment and/or the bituminous materials so as to at least partially remove the bituminous materials from the surface of the well equipment. In certain embodiments, after the treatment fluid has been allowed to interact with the bituminous materials, the bituminous materials may be filtered or removed from the well bore and/or the wellbore and surface equipment by any means practicable for the given application.

In another embodiment, the present invention provides a method comprising: placing a treatment fluid comprising an aqueous fluid and solid nanoparticles into a well bore; and monitoring the amount of the solid nanoparticles present in the treatment fluid. For example, once a unit of solid nanoparticles in a treatment fluid is allowed to interact with a unit of the surface of the well equipment and/or the bituminous materials, that unit of solid nanoparticles may be depleted from the treatment fluid and thus unable to further interact with the surface of the well equipment and/or the bituminous materials. For this reason, it may be desirable to monitor the concentration of the solid nanoparticles in the treatment fluid to determine if additional solid nanoparticles should be added. In some embodiments, the solid nanoparticles may be introduced into the treatment fluid before the treatment fluid is introduced into the well bore, for example, a batch-mixing process. In some embodiments, it may be desirable to continue to add the solid nanoparticles to the treatment fluid (e.g., "on-the-fly" mixing) according to the monitored concentration of the solid nanoparticles in the treatment fluid. In some embodiments, the concentration of solid nanoparticles in the treatment fluid may be monitored by direct measurement. In some embodiments, the concentration of solid nanoparticles in the treatment fluid may be monitored indirectly by measuring the depletion of the solid nanoparticles from the treatment fluid. The concentration of the solid nanoparticles in the treatment fluid may be monitored, for example, by filtration followed by dynamic light scattering, analytical polymer spectroscopy, chromatography, gravimetry, and quantitative precipitation.

Another embodiment provides a method of drilling a well bore comprising: using a drill bit to enlarge a well bore; and circulating a treatment fluid past the drill bit to remove cuttings therefrom, the treatment fluid comprising an aqueous fluid and solid nanoparticles. In certain embodiments, bituminous materials may be present within the well bore, and the solid nanoparticles may be allowed to interact with the surface of the well equipment and/or the bituminous materials to at least partially remove the bituminous materials from the surface of the well equipment. In certain embodiments, after the solid nanoparticles have been allowed to interact with the well equipment and/or the bituminous materials, the bituminous materials may then be filtered and/or removed from the well bore and/or the wellbore and surface equipment by any means practicable for the given application.

In applications where it is desirable to drill through bituminous sand zones encountered in the course of drilling a well bore, cuttings may be removed more effectively from the well bore. In addition, bituminous materials treated with the methods of the present invention may be separated from a treatment fluid or other fluids mixed with the treatment fluid by passing the fluid(s) through a screen or similar separation apparatus.

In accordance with present embodiments, in well bore operations where bituminous materials that comprise heavy oil are encountered, treatment with a treatment fluid comprising nanoparticles may not emulsify the heavy oil in the treatment fluids. As a result, heavy oil treated in this manner may be susceptible to screen separation from the treatment fluid or other fluids mixed with the treatment fluid as well as drill cuttings, bituminous sands, and the like.

In accordance with some embodiments, the methods of the present invention may comprise allowing a treatment fluid comprising solid nanoparticles to interact with bituminous materials comprising heavy oil in a well bore, which may, among other things, cause the heavy oil to agglomerate to facilitate removal of the heavy oil from the treatment or other present fluids and prevent emulsification. In addition, bituminous materials comprising heavy oil treated with the methods of the present invention may be separated from a treatment fluid or other fluids mixed with the treatment fluid by passing the fluid(s) through a screen or similar separation apparatus.

The exemplary solid nanoparticles and/or associated treatment fluids disclosed herein may directly or indirectly affect one or more components or pieces of equipment associated with the preparation, delivery, recapture, recycling, reuse, and/or disposal of the disclosed solid nanoparticles. For example, the disclosed nanoparticles and/or associated treatment fluids may directly or indirectly affect one or more mixers, related mixing equipment, mud pits, storage facilities or units, fluid separators, heat exchangers, sensors, gauges, pumps, compressors, and the like used generate, store, monitor, regulate, and/or recondition the exemplary solid nanoparticles and/or associated treatment fluids. The disclosed solid nanoparticles may also directly or indirectly affect any transport or delivery equipment used to convey the solid nanoparticles to a well site or downhole such as, for example, any transport vessels, conduits, pipelines, trucks, tubulars, and/or pipes used to fluidically move the solid nanoparticles and/or associated treatment fluids from one location to another, any pumps, compressors, or motors (e.g., topside or downhole) used to drive the solid nanoparticles and/or associated treatment fluids into motion, any valves or related joints used to regulate the pressure or flow rate of the solid nanoparticles and/or associated treatment fluids, and any sensors (i.e., pressure and temperature), gauges, and/or combinations thereof, and the like. The disclosed nanoparticles and/or associated treatment fluids may also directly or indirectly affect the various downhole equipment and tools that may come into contact with the chemicals/fluids such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like. As previously described, the solid nanoparticles may be applied to the surface of well equipment (including downhole equipment and equipment used at the surface) to treat bituminous material adhesion.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of treating the surface of well equipment, comprising:
    introducing solid nanoparticles into a treatment fluid, wherein the solid nanoparticles are covalently functionalized;
    introducing the treatment fluid comprising solid nanoparticles into the well equipment;
    applying a solid nanoparticle film to the surface of the well equipment with the treatment fluid comprising solid nanoparticles, wherein the solid nanoparticles have a roundness and sphericity of greater than about 0.7 on the Krumbein scale; and
    allowing the solid nanoparticles to interact with bituminous materials adhered to the surface of the well equipment to remove at least a portion of the bituminous materials from the surface of the well equipment;
    wherein interaction of the solid nanoparticles prevents emulsification of the bituminous materials in the treatment fluid;
    wherein the solid nanoparticles comprise at least one unit selected from the group consisting of: $Al_2O_3$, boehmite, $TiO_2$, ZnO, $Fe_2O_3$, ZrO, $CaCO_3$, SiC, $Si_3N_4$, graphite, activated carbon, carbon black, and combinations thereof, and wherein the concentration of solid nanoparticles in the treatment fluid is between about 0.1% and about 5% by volume of the treatment fluid; and
    wherein the treatment fluid further comprises a polymer selected from the group consisting of styrene polymers and any derivative thereof, acrylate polymers and any derivative thereof, styrene-acrylate polymers and any derivative thereof, acrylonitrile-butadiene polymers and any derivative thereof, and any combination thereof.

2. The method of claim 1 further comprising filtering the bituminous materials from the treatment fluid and/or other fluids present in the well bore.

3. The method of claim 1 further comprising monitoring the amount of the solid nanoparticles present in the treatment fluid; and adding additional solid nanoparticles to the treatment fluid in response to the step of monitoring.

4. The method of claim 1 wherein the treatment fluid is placed in a well bore to interact with bituminous materials present at a specific location therein.

5. The method of claim 1 wherein the treatment fluid is placed into a well bore during drilling of the well bore.

6. The method of claim 1 wherein the average particle size of the solid nanoparticles is less than about 200 nm.

7. The method of claim 1 wherein the nanoparticles have been surface treated with at least one polymer selected from the group consisting of: polyvinyl pyrrolidone, polyvinyl alcohol, polyacrylic acid, polyethyleneimine, and any combination thereof.

8. The method of claim 1 wherein the treatment fluid further comprises an additive selected from the group consisting of: salts, surfactants, fluid-loss-control additives, gas, nitrogen, carbon dioxide, surface-modifying agents, tackifying agents, foamers, corrosion inhibitors, scale inhibitors, catalysts, clay-control agents, biocides, friction reducers, antifoam agents, bridging agents, dispersants, flocculants, $H_2S$ scavengers, $CO_2$ scavengers, oxygen scavengers, lubricants, viscosifiers, breakers, weighting agents, relative-permeability modifiers, resins, particulate materials, wetting agents, coating-enhancement agents, and any combination thereof.

9. The method of claim 1 wherein the well equipment comprises equipment selected from the group consisting of: drill pipe, drill collars, drills bits, mud motors, directional drills, casings, liners, shakers, shaker screens, centrifuges, metal lines, fittings, impellers, and any combination thereof.

10. The method of claim 1 wherein the solid nanoparticles are covalently functionalized with at least one reactive functional group selected from the group consisting of: tricholorosilanes, alkoxysilanes, esters, alcohols, acids, amines, and carboxylates.

11. The method of claim 3, wherein the monitoring comprises direct measurement monitoring.

12. The method of claim 3, wherein the monitoring comprises indirect monitoring by measuring the depletion of the solid nanoparticles from the treatment fluid.

13. The method of claim 3, wherein the monitoring comprises monitoring the concentration of solid nanoparticles by filtration followed by a method selected from the group consisting of dynamic light scattering, analytical polymer spectroscopy, chromatography, gravimetry, quantitative precipitation, and combinations thereof.

14. The method of claim 1, wherein the solid nanoparticles are provided as a spot treatment.

* * * * *